United States Patent [19]

Narum

[11] Patent Number: 4,815,295
[45] Date of Patent: Mar. 28, 1989

[54] VALVE ACTUATOR SYSTEM FOR CONTROLLING VALVES

[75] Inventor: Henning Narum, Eina, Norway

[73] Assignee: A/S Raufoss Ammunisjonsfabrikker, Norway

[21] Appl. No.: 26,697

[22] PCT Filed: Jun. 3, 1986

[86] PCT No.: PCT/NO86/00038
§ 371 Date: Mar. 26, 1987
§ 102(e) Date: Mar. 26, 1987

[87] PCT Pub. No.: WO86/07427
PCT Pub. Date: Dec. 18, 1986

[30] Foreign Application Priority Data
Jun. 3, 1985 [NO] Norway .................. 852224

[51] Int. Cl.⁴ .................. F01B 29/08; F02N 13/00
[52] U.S. Cl. ..................... 60/632; 60/635; 60/636
[58] Field of Search .................. 60/632–638

[56] References Cited

U.S. PATENT DOCUMENTS 3,031,845  5/1962  Ludwig .................. 60/632
3,837,671  9/1974  Hamilton .................. 60/632

Primary Examiner—Allen M. Ostrager
Attorney, Agent, or Firm—Bacon & Thomas

[57] ABSTRACT

A valve actuator system for use above or under water is disclosed wherein at least one gas generator (1, 2) is provided for controlling the system. The gas generator(s) can be actuated by remote control, by use of electric cables or hydro-acoustically without the use of cables. Locking mechanisms may be provided in order to lock the actuators in open and/or closed positions. The locking mechanisms may be actuated by the gas generator(s). Each gas generator is equipped with its own safety system, in that the charge itself is protected by a piston (26), thermal insulation (32) and a burst disc (31). The valve actuator is protected against excessive pressure by a safety shear disc (13, 14) connected with a dead volume (10). Two-way control of actuators is achieved by using a bisected piston system.

7 Claims, 3 Drawing Sheets

VALVE ACTUATOR SYSTEM FOR CONTROLLING VALVES

BACKGROUND OF THE INVENTION

The present invention relates to a valve actuator system for controling or actuating valves, above or under water.

It is known to control valves hydraulically, pneumatically and mechanically. Such controls are used, for instance, in offshore hydrocarbon production. A disadvantage of these controls is that all the necessary energy for the movement of the shut-off members of the valves must be supplied over long distances, from either a fixed or a floating installation.

Another disadvantage, in particular of hydraulic systems, is that these systems are very complicated and expensive, especially when used in connection with emergency shut-off valves which are rarely used. The hydraulic systems also are uneconomical since much maintenance work must be done without daily use of the systems.

SUMMARY OF THE INVENTION

In accordance with the present invention it has been found that gas generators can be used to operate valve actuators for emergency shut-off valves and other suitable valves.

As used herein, the term gas generator means a generator which by combustion of gunpowder inside a casing, the generator develops a gas, which, because of its pressure, is able to shift a movable member in the valve actuator, such as a piston.

Such gas generators may be fired by use of electric current. This may take place by use of a hydro-acoustic system to control accumulators which supply the current. Coded pulses through the water may also be used. Thus, the firing of the gas generators may take place without any direct connection between the gas generators and the place where the control is carried out. Uniquely coded pulses may be used for different operations and different gas generators, so that a completely selective remote control is achieved without any connection other than the water itself.

In accordance with the invention, a gas generator device is used for control or actuation of valve actuators, whereby each actuator is associated with at least one gas generator, for movement of the piston of the valve actuator by means of the gas generator or generators.

The firing of the gas generators may as an alternative to electric firing, be carried out by mechanical detonators, chemical systems or by means of laser technique through optical fibre cables.

The invention in the following will be explained closer, with reference to the accompanying drawings.

DETAILED DESCRIPTION OF THE PREFERRED EMBODIMENTS

Figure 1:
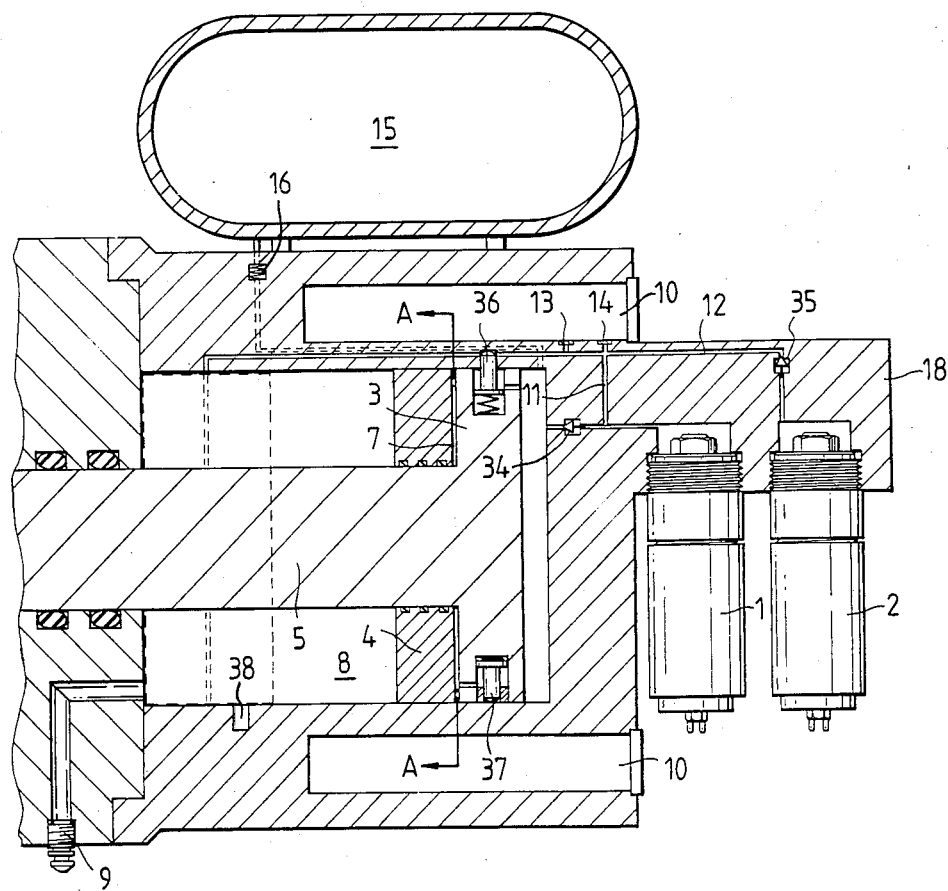
FIG. 1 is a longitudinal cross-sectional view of a first embodiment of the valve actuator according to the invention.

FIG. 1 shows a cross-sectional view of a valve actuator based on the use of gas generators which generate gunpowder gas.

In FIG. 1, gas generators 1 and 2 are used for the closing and opening functions. It will be understood that there may be several gas generators for repeated opening and closing functions. The broken lines show the pistons when the valve is in a closed position.

The actuator is equipped with two pistons, a main piston 3 and a sub-piston 4. The sub-piston runs freely on the piston rod 5.

Figure 2:
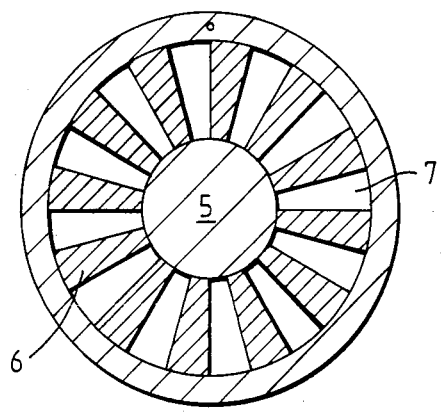
FIG. 2 is a cross-sectional view taken along line A—A in FIG. 1.

FIG. 2 shows the face of the sub-piston as seen from line A—A in FIG. 1. The ribs 6 form cavities 7 between the sub-piston 4 and the main piston 3. The piston rod 5 is connected to the valve itself to be opened or closed (not shown). The purpose of two pistons will be explained below.

The space behind the two pistons in the cylinder chamber 8 of the actuator is filled with a liquid which is discharged through a valve means to control the movement of the actuator during the closing function. Valve means may comprise a rupturable shear disc 9 or a spring biased check valve. During movement of the pistons 3 and 4 the liquid is discharged out to the atmosphere through a shear disc 9 or to a separate tank (not shown) when the actuator is used under water.

Further, the actuator is provided with a dead volume 10 for protection against excessive pressure. The dead volume is connected to the passages 11, 12 from the gas generators 1, 2 through safety shear discs 13, 14.

Figure 4:
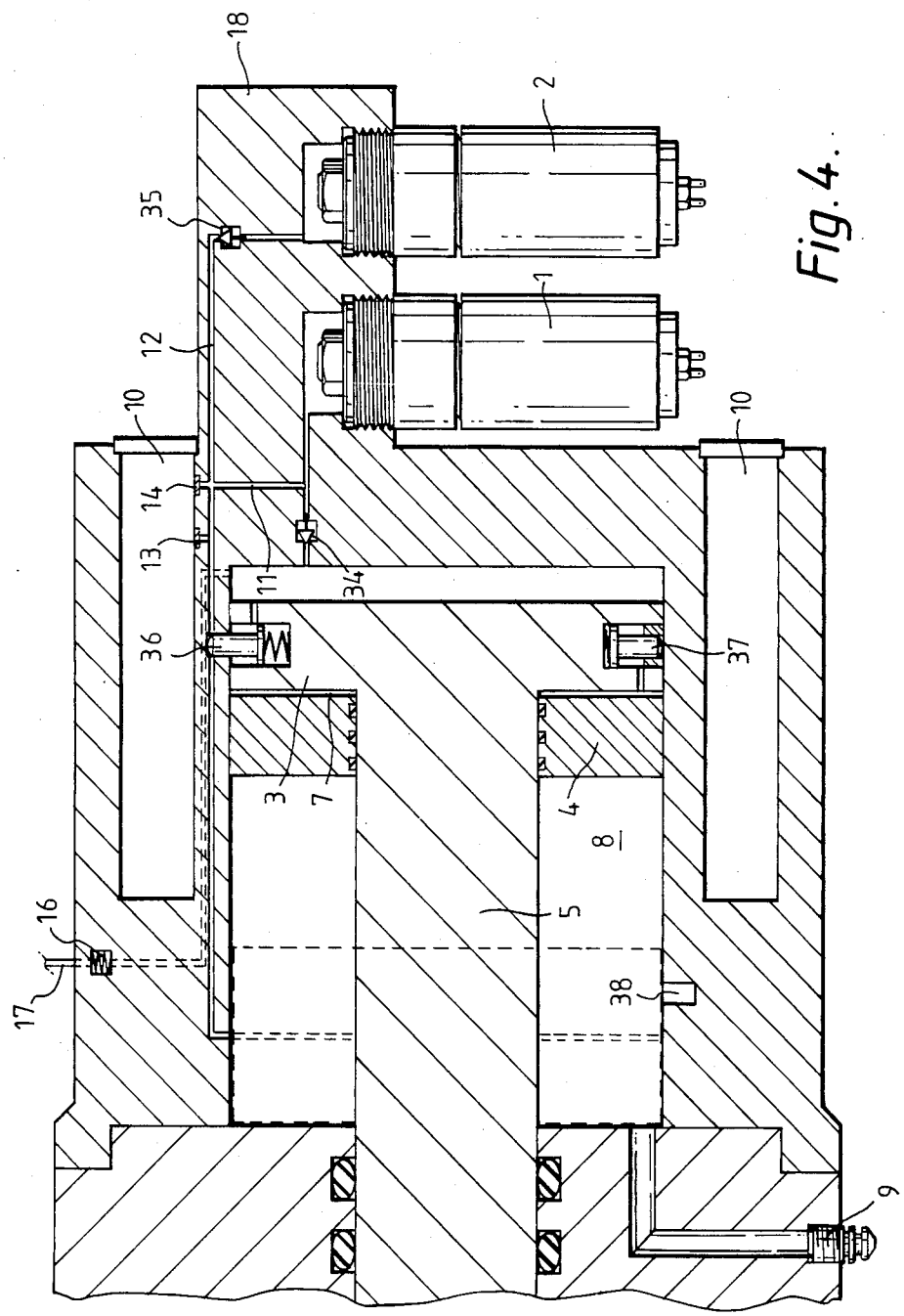
FIG. 4 is a longitudinal cross-sectional view of a second embodiment of the valve actuator according to the invention.

When the valve actuator is used under water it may be necessary to vent the residual pressure in the cylinder of the actuator when used one or more times. In FIG. 1 this is accomplished by an expansion tank 15 associated with the cylinder chamber 8 of the actuator through a labyrinth passage 16. In FIG. 4 an alternative is shown where the venting takes place by means of a tube 17 to the surface through the same labyrinth passage. The purpose of the labyrinth passage is to prevent any substantial pressure loss during the operation.

The gas generators 1, 2 are screwed directly into the cylinder wall 18 of the actuator. The gas generators may also be connected with the cylinder wall 18 of the actuator through tubes if desired (not shown). The gas generators 1, 2 have been shown in detail in FIG. 3.

The functioning of the gas generators is explained in the following.

The purpose of the system described below is to protect each gas generator against the others when several gas generators have been assembled in a system. It is necessary to protect the powder charge 19 against pressure and temperature.

The housing 20 has a connector 21 for the electric cords (not shown) and an igniter device 22, and is connected to the discharge portion 23. A valve 26 is also provided, bearing against a valve seat 27 in the coupling part 24. The valve 26 is mounted in the system by means of a second coupling part 28 having a pre-tensioning nut 29 and defining cylinder 28a. The valve stem 30 is connected to the coupling part 28 through a burst disc 31. Behind the valve seat 27 thermal insulation 32 is provided.

During the assembly the pre-tension nut 29 is tightened, so that the valve 26 bears against the valve seat 27. This will make a safe barrier against influence of pressure from other gas operations on the powder charge 19. The thermal insulation 32 protects against the influence of the temperature.

Figure 3:
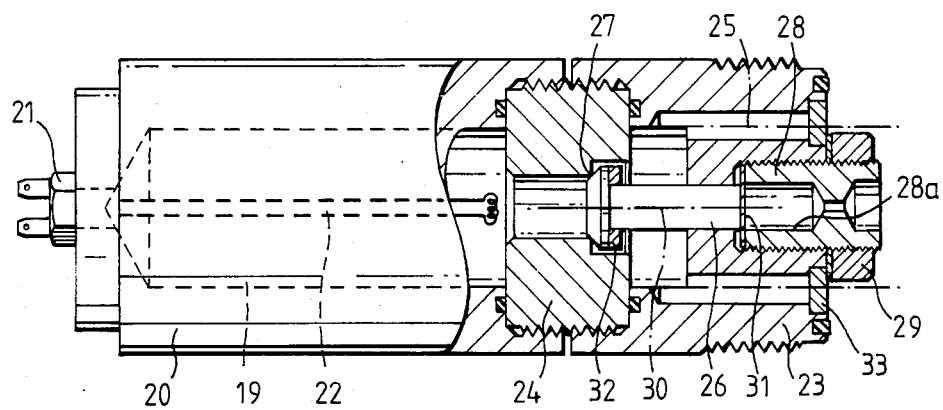
FIG. 3 is a longitudinal cross-sectional view of a gas generator according to the invention.

In order to actuate the gas generator, an electric current is supplied to resistance cords 22 which causes ignition of the powder charge 19. The built up pressure forces the valve 26 to move backwardly (to the right as seen in FIG. 3) and burst the disc 31. The gas will then flow out into the passages 25, through the filters 33, and into the cylinder chamber 8 of the valve actuator through check valves 34 or 35. The fragments of disc 31 will remain behind the valve 26.

The system comprising valve 26 and burst disc 31 has been chosen in order to prevent pieces of traditional burst discs from destroying piston surfaces in the actuator, clogging passages, etc.

By ignition of a gas generator 1, 2 as explained above gas pressure will cause the the locking mechanism 36 to open, and the main piston 3 and the sub-piston 4 of the actuator will move to the positions shown with broken lines in FIGS. 1 and 4. If it is desired to lock the actuator in the closed position a locking mechanism 37 comprising a spring biased pin as shown in FIGS. 1 and 4 can be used. When the pin is aligned with hole 38 in cylinder wall 18, the spring will force the pin into the hole. Gas pressure between pistons 3 and 4 will retract the pin and unlock the piston 3.

The pressure in the liquid behind the pistons 3 and 4 in chamber 8 will cause the shear disc 9 to burst and the liquid will then flow out as explained earlier and will control the valve actuator movement hydraulically.

If the pistons 3, 4 in the valve actuator for some reason are not able to be moved, the pressure ahead of the main piston will build up, so that the safety shear discs 13, 14 will be ruptured and the gas is conducted into the dead volume 10. Thus, this is a safety function in the system. By multi-operations each gas generator will have its own passage to the dead volume, so that several attempts at operating the actuator may be made.

For opening (reversing) the actuator, the gas generator 2 is actuated and the gas will flow in between the main piston 3 and the sub-piston 4 in their positions indicated by broken lines.

The gas pressure causes the locking mechanism 37 to open up and the main piston 3 will then move towards its open position (toward the right as seen in FIGS. 1 and 4). The opening velocity is less critical than the closing velocity for pure emergency shut-off valves. Therefore, the opening velocity may be controlled by the combustion time of the gas generator.

The purpose of using two-pistons is to avoid any adverse effects of conducting the hot gas into chamber 8 filled with the liquid.

For multi-operations, new liquid must be pumped in behind the sub-piston 4, so that it will move up towards the main piston 3 as shown in FIGS. 1 and 4.

What is claimed:

1. A valve actuator for controlling valves comprising:
    (a) actuator housing means defining a cylinder chamber having first and second ends;
    (b) a main piston slidably received in the cylinder chamber;
    (c) a sub-piston slidably received in the cylinder chamber located between the main piston and the first end of the cylinder chamber;
    (d) means connecting the main piston to a valve to be actuated;
    (e) a fluid disposed in the cylinder chamber between the sub-piston and the first end of the cylinder chamber;
    (f) gas generating means connected to the actuator housing means;
    (g) gas conduit means fluidly interconnecting the gas generating means with the cylinder chamber at least between the main piston and the second end of the cylinder chamber such that gas generated by the gas generating means urges the main piston which, in turn, urges the sub-piston toward the first end of the cylinder chamber thereby actuating the valve; and,
    (h) means in fluid communication with the fluid in the cylinder chamber being normally closed so as to retain the fluid therein, until a predetermined fluid pressure is reached at which pressure the means opens to permit pressurized fluid to pass therethrough to control the movement of the pistons toward the first end of the cylinder chamber.

2. The valve actuator according to claim 1 further comprising at least one cavity defined by the sub-piston on a side facing the main piston.

3. The valve actuator according to claim 2 further comprising:
    (a) a second gas generating means; and,
    (b) second gas conduit means interconnecting the second gas generating means with the cylinder chamber such that, when the main piston and sub-piston are adjacent to the first end of the cylinder chamber, the gas generated by the second gas generating means enters the cylindrical chamber between the main piston and the sub-piston and returns the main piston to a position adjacent the second end of the cylinder chamber.

4. The valve actuator according to claim 1 further comprising:
    (a) a dead volume defined by the actuator housing;
    (b) second conduit means interconnecting the dead volume and the gas conduit means; and,
    (c) pressure relief means in the second conduit to normally close the second conduit until a second predetermined pressure is reached, at which pressure the pressure relief means opens to allow gas to enter the dead volume.

5. The valve actuator according to claim 4 further comprising:
    (a) an expansion tank; and,
    (b) means defining a labyrinth passage interconnecting the interior of the expansion tank and the cylinder chamber.

6. The valve actuator according to claim 4 further comprising means defining a labyrinth passage extending from the cylinder chamber to an exterior surface of the actuator housing.

7. The valve actuator according to claim 1 wherein the gas generating means comprises:
    (a) a housing having a gas outlet;
    (b) a flammable material located in the housing;
    (c) means to ignite the flammable material so as to generate a pressurized gas;
    (d) valve means in the gas outlet; and,
    (e) biasing means bearing against the valve means so as to bias the valve means such that the gas outlet is normally closed, the biasing means including a frangible member that is ruptured by the valve when the gas pressure exceeds a predetermined value, thereby opening the gas outlet.

* * * * *